Figure 1:
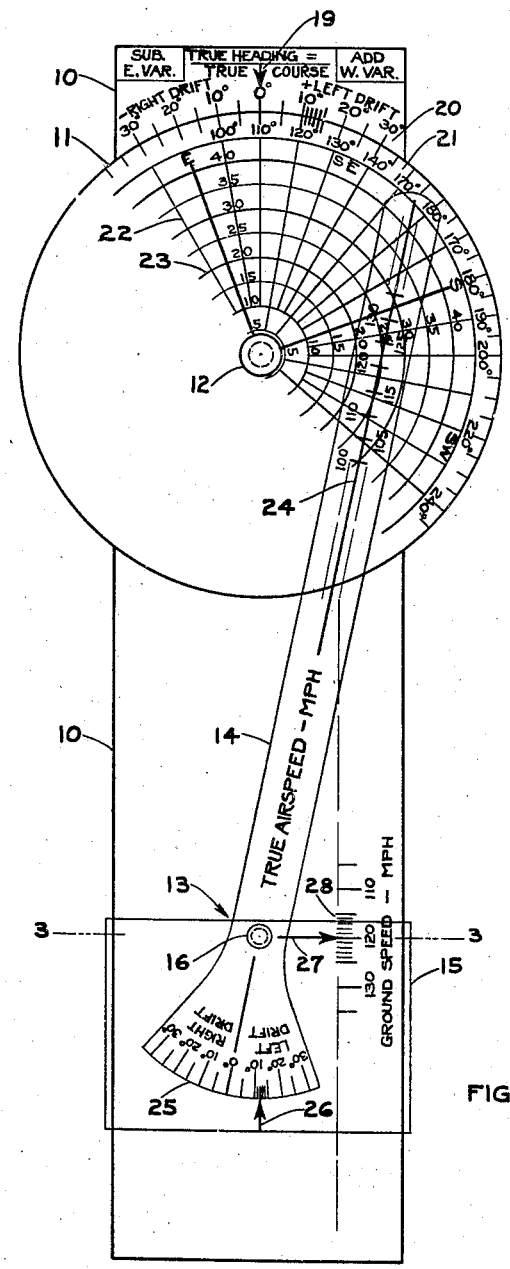

Jan. 11, 1944.  E. C. HOKANSON  2,339,222
FLIGHT CALCULATOR
Filed Feb. 28, 1941  2 Sheets-Sheet 1

INVENTOR
Evert Carl Hokanson

Jan. 11, 1944.  E. C. HOKANSON  2,339,222
FLIGHT CALCULATOR
Filed Feb. 28, 1941  2 Sheets-Sheet 2

INVENTOR
Evert Carl Hokanson

Patented Jan. 11, 1944

2,339,222

UNITED STATES PATENT OFFICE 2,339,222

FLIGHT CALCULATOR

Evert Carl Hokanson, Arlington County, Va., assignor to Aeronav Instrument Company, New York, N. Y., a proprietorship of New York, N. Y.

Application February 28, 1941, Serial No. 381,145

6 Claims. (Cl. 235—61)

This invention relates to simplification and improvements of mechanical calculating and computing devices, more particularly to calculating and computing instruments of the portable type adapted to make calculations and computations pertaining to air navigation.

Air navigation by means of dead reckoning involves a number of variables, the determination of which must be accomplished in a simple and straightforward manner in the least time possible. These variables are: true airspeed (the true velocity of the aircraft relative to the air), (2) ground speed (the velocity of the aircraft relative to the ground), (3) true heading (the true direction in which the aircraft is headed), (4) true course (the true direction in which the air craft is moving relative to the earth), (5) drift (the angle between the true course and the true heading), (6) wind velocity and (7) true wind direction. By proper use and combinations of these variables, that is, by dead reckoning, it is possible to determine or to predetermine a new position from a known postion.

In every case a certain number of the aforementioned variables are known and the others are unknown but can be calculated or computed trigonometrically, vectorially or mathematically. My invention provides simplified means for rapidly determining the unknown variables from the the known variables as well as presenting a graphic picture of the relation between certain variables, namely true airspeed, true heading, ground speed, true course, wind velocity, true wind direction and drift.

The importance of solving air navigation problems accurately and quickly is recognized by pilots and all persons charged with the responsibility for aircraft flights, particularly when weather conditions are such that it is necessary to rely on the instruments in the aircraft (instrument flying rather than by visual observation of the terrain over which the flight is being made. Changing conditions such as a change in wind direction and velocity, which may be encountered during a flight, requires the solving of another air navigational problem by dead reckoning, in order to determine the new course and time of arrival. This is readily accomplished on large aircraft where one man is the navigator having a navigator's table, maps, charts, straight edges, scales, protractors, etc., at his disposal. On small aircraft, where one man must be sufficient unto himself, it is necessary that he have reliable aids which he can operate while he is flying the aircraft. An attempt has been made to supply this need by the use of various mechanical devices, but these have been either too cumbersome, heavy and expensive or too complicated and thereby requiring the memorizing of definite procedures which may be forgotten in the stress of an emergency. Some of these mechanical navigational devices now in use have proved satisfactory for professional pilots but have not supplied the need of the private pilot who only makes an occasional cross-country flight.

The general object of my invention is to supply the need for a mechanical air navigational calculating device. More specifically to supply the private pilot's need for a flight calculator.

It is also the object of my invention to provide a flight calculator which is simple, understandable, and so constructed that the elements form a graphic picture of the basic wind triangle as taught in all aviation ground schools.

Another object of my invention is to provide a flight calculator for the pivate pilot which combines in one instrument simplified means for calculating all the essential factors involved in air navigation problems.

A further object of my invention is to provide a flight calculator of rugged construction, light in weight, relatively inexpensive and of a size which can be easily carried in an average size coat pocket and thus be readily available at all times both prior and during a flight.

These objects are attained in a mechanical navigational and computing device constructed according to my invention. The accompanying drawings illustrate the principle and the simplicity of construction of the invention.

Figure 2:
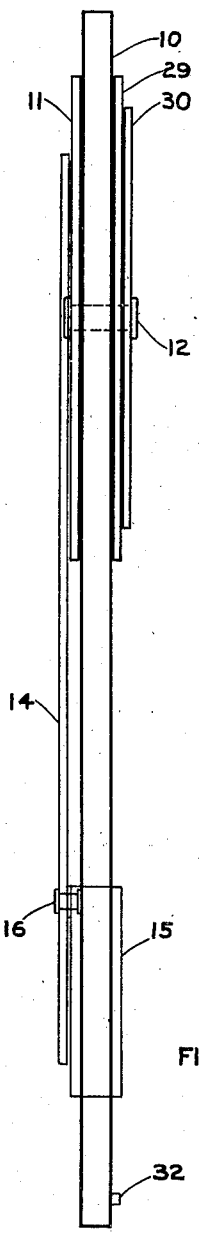
Figure 3:
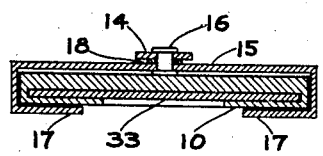
Figure 6:
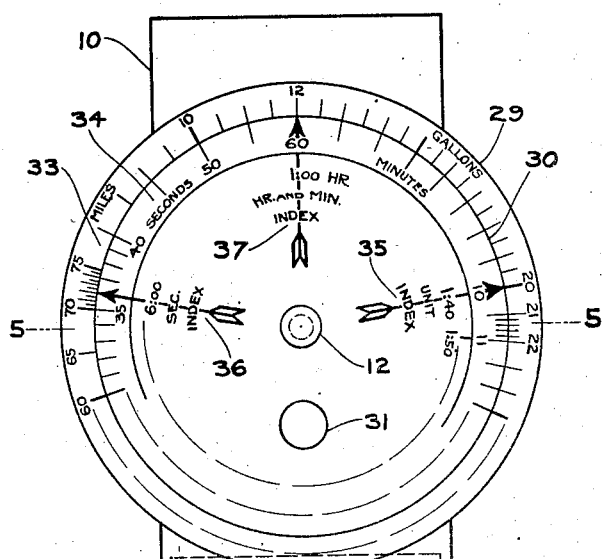
Figure 6:
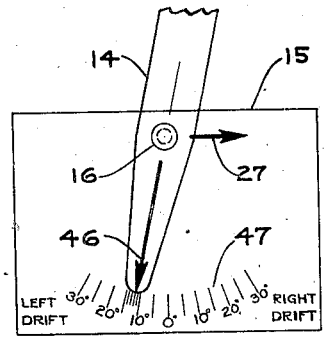
Figure 5:
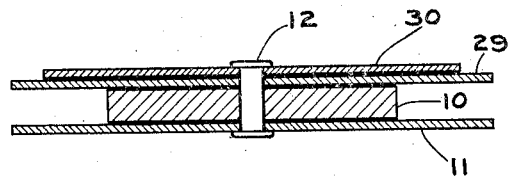
Figure 4:
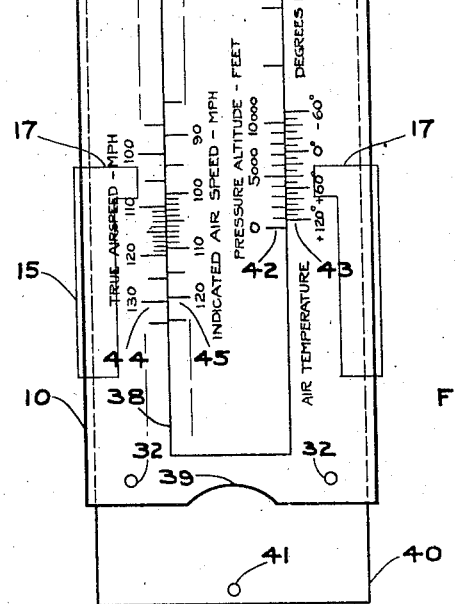

Figure 1 shows the navigation side of the calculator. Figure 2 shows a side view of the calculator. Figure 3 shows a sectional view of the calculator as developed on the line 3—3 of Figure 1. Figure 4 shows the flight factor side of the calculator. Figure 5 shows a sectional view developed on the line 5—5 of Figure 4. Figure 6 shows a variation of the navigation side of the calculator as illustrated in Figure 1. All markings on the surfaces of the component parts of the flight calculator are printed, stamped, engraved or marked by some similar means.

A general description will first be given of the navigational side of the flight calculator as shown in Figure 1. The base 10 of the device is a flat member made of opaque material which is relatively thin and approximately four to five times as long as it is wide. Near one end of the base 10 is a pivot 12 by means of which a flat circular disc or wind dial 11 is rotatably mounted on the base 10. The wind dial 11 is a combination compass card and graduated wind rose made of an opaque material, the radial lines 22 correspond to wind directions, the circular lines 23 correspond to wind velocities and the graduations 21 adjacent the outer edge of the dial correspond to the graduations of a compass card. These graduations 21 are used for both courses and wind directions so that they maintain fixed relations to one another at all times. The base 10 has an arcuate scale 20 and a true course index 19 which cooperate with the outer graduations 21 of the wind dial 11. The slide assembly 13 comprises an arm 14, a slide member 15 and a pivot 16. The arm 14 has an arcuate scale 25 at one end which corresponds to drift angle, a linear scale 24 which corresponds to true airspeed, is made of a transparent material and is mounted by means of the pivot 16 to slide member 15 in order to obtain angular movement for a drift indication. The slide member 15 is made of a transparent material, is slidably mounted on the base 10, has flanged portions 17 which engage the sides of the base 10 in a manner to permit reciprocal movement of the slide assembly 13 over the base 10, has an index 26 which cooperates with the arcuate scale 25 to indicate drift angle and has an index 27 which cooperates with the linear scale 28 on the base 10 to indicate ground speed. The washer 18 spaces the arm 14 from the slide member 15. The linear scale 24 cooperates with the wind direction lines 22 and the wind velocity lines 23 to indicate wind direction and wind velocity.

The flight factor side of the flight calculator is shown in Figure 4. The base 10 has a window 38 through which the slidable scale member 40 is viewed. The slidable scale member 40 is mounted for sliding within the base 10 and has two linear logarithmic scales 42 and 45 which correspond to pressure altitude and indicated airspeed respectively. Adjacent the long sides of the window 38 are linear logarithmic scales 43 and 44 which correspond to air temperature and true airspeed respectively. The linear scales 43 and 44 cooperate with the linear scales 42 and 45 for performing the calculations required to convert indicated airspeed to true airspeed for variations in air temperature and pressure altitude. The stop 41 which projects up from the surface of the slidable scale member 40 serves as a means for grasping the slidable scale member 40 and also limits its movement in one direction by engaging one end of the base 10. The cutout 39 in one end of the base 10 permits the stop 40 to engage the base 10 in a position whereby the slidable scale member 40 can be completely enclosed in the base 10 when not in use. The stops 32 on the base 10 serve to limit the slide assembly 13 movement by engaging the flanged portion 17 of the slide member 15. Two flat circular discs 29 and 30 are made of an opaque material, mounted on the base 10 by means of the single pivot 12 and have circular logarithmic scales 33 and 34 respectively, which correspond to miles or gallons and time. These logarithmic scales cooperate to perform the calculations required to determine distance, speed, fuel consumption or fuel consumed. The top disc 30 has a hole 31 which serves as a means for easily rotating the disc 30 with respect to the disc 29 and three indices 35, 36 and 37 which correspond to units, seconds and hours or minutes respectively, for simplifying the solving of air navigation problems.

The simplicity of construction is shown in Figures 2, 3 and 5. Figure 6 shows an alternate method for obtaining a drift angle indication which consists of having an index 46 on the arm 14 and an arcuate scale 47 on the slide member 15 in place of the arrangement shown in Figure 1.

The mechanical calculating and computing device described above provides means for rapidly determining the essential flight factors involved in air navigation problems in a manner which is a direct carry over from the basic principles of air navigation as presented by all ground schools and air navigation text books. One man can readily use the device while piloting an aircraft as it can be held and operated by one hand while the other hand is free to operate the controls of the aircraft.

The operation of the flight calculator can best be described by solving typical air navigation problems. This will also indicate the importance of combining all the elements as described above in a single device.

*Problem 1.*—Let it be assumed that it is desired to fly from point A to point B. The distance in miles, the true course in degrees and the magnetic variation are obtained from a suitable map such as the United States Coast and Geodetic Survey sectional aeronautical chart. The most favorable altitude for the flight is determined from a source such as the United States Weather Bureau wind aloft reports which give wind velocities, true wind directions and air temperatures at altitudes. The cruising true airspeed and fuel consumption are determined from the selected altitude and the cruising performance of the aircraft to be used. Let it be further assumed that the following factors were determined by the above method:

| | |
|---|---|
| Distance _____ miles__ | 214 |
| True course _____ degrees__ | 110 |
| Magnetic variation _____ degrees west__ | 10 |
| Pressure altitude _____ feet__ | 5000 |
| Wind velocity _____ miles per hour__ | 25 |
| Wind direction _____ degrees__ | 220 |
| Air temperature _____ degrees F__ | 40 |
| True airspeed _____ miles per hour__ | 113 |
| Fuel consumption _____ gallons per hour__ | 8 |

With the above factors known it now becomes necessary to calculate the remaining factors if the flight is to be completed successfully by means other than trial and error or by visually following a highway, railroad track or other landmarks.

The flight factors to be determined are:
    Drift angle in degrees
    True heading in degrees
    Magnetic heading in degrees
    Ground speed in miles per hour
    Indicated airspeed in miles per hour
    Total time for the flight in hours and minutes
    Total fuel consumption in gallons Drift angle, true heading and ground speed are readily determined on the navigation side of the flight calculator as shown in Figure 1 and as described below. Rotate the wind dial 11 until 110° line is adjacent the true course index 19. Place the point corresponding to 113 miles per hour of the linear scale 24 directly over the intersection of wind direction line corresponding to 220° and the circular wind velocity line corresponding to 25 miles per hour. Read the drift angle 12° left drift on the arcuate scale 25 adjacent the drift angle index 26. Read the true heading 122° on the circular scale 21 adjacent the 12° left drift line on the arcuate scale 20. The magnetic variation being west is added to the true heading, hence the magnetic heading = 122°+10°=132° Read the ground speed 120 miles per hour on the ground speed scale 28 adjacent the index 27. Thus, drift angle, true heading, magnetic heading and ground speed have been easily predetermined by two settings on the navigation side of the flight calculator. The remaining factors must now be determined on the flight factor side as shown in Figure 4.

When the cruising true airspeed is selected or determined by the selected altitude and the cruising performance of the aircraft to be used, it is necessary to determine the indicated airspeed that must be maintained to make good the selected true airspeed. The airspeed indicating instruments normally used in aircraft measures the impact pressure of the air. For this reason the indicated airspeed reading must be corrected for air density, that is air temperature and pressure, in order to determine the true speed of the aircraft relative to the air when conditions are other than that which the instrument is calibrated for, that is, standard sea level air temperature and atmospheric pressure This is accomplished on the flight factor side of the calculator as shown in Figure 4 by moving the slidable scale member 40 until 5000 foot pressure altitude line on the linear scale 42 is adjacent the 40° Fahrenheit air temperature line on the linear scale 43. Read the indicated airspeed 105 miles per hour on the linear scale 45 adjacent the 113 miles per hour line on the linear scale 44. The total time for the flight and the total fuel consumption are determined by means of the two flat circular discs 29 and 30. To determine the total time rotate disc 30 relative to disc 29 until the "Hr. and Min. index" 37 is adjacent the 12 line on the circular scale 33 (the 12 line corresponds to 120 miles per hour ground speed determined on the navigation side of the flight calculator as explained above). Read the total time 107 minutes, or 1 hour and 47 minutes, on the circular scale 34 adjacent the 21.4 line on the circular scale 33 (the 21.4 line corresponds to the distance from A to B of 214 miles). To determine the total fuel consumed during the flight rotate disc 30 relative to disc 29 until the "Hr. and Min. index" 37 is adjacent the 80 line on the circular scale 33 (the 80 line corresponds to the 8 gallons per hour fuel consumption determined from the performance charts of the aircraft). Read the total fuel consumed 14.3 gallons on the circular scale 33 adjacent the 107 minute line on the circular scale 34. Thus the indicated airspeed, the total time for the flight and the total fuel consumed during the flight have been predetermined by but one setting each on the flight factor side of the flight calculator.

*Problem 2.*—Let it be assumed that on reaching the destination, point B, a landing could not be made due to a heavy ground fog and that it was decided to return to point A. Let it be further assumed, for simplicity, that the original weather conditions of Problem 1 still prevailed and that it was desired to fly at the same altitude and airspeed. The flight factors listed for the previous problem must again be determined as in this case the true course would be a reciprocal of the original true course or 110°+180°=290°.

By following the procedure given in Problem 1, the factors determined on the navigation side of the flight calculator are: drift angle 11° right drift, true heading 279°, magnetic heading 289° and ground speed 102 miles per hour. The factors determined on the flight factor side of the flight calculator are, total time for the flight 126 minutes, or 2 hours and 6 minutes, and total fuel consumed 16.7 gallons. Thus the pilot in flight can readily determine new headings, the time and the fuel required to reach alternate fields, in case it becomes necessary due to unforseen conditions. This is of particular importance when the flight is conducted wholly or in part, on instruments where the pilot can not see landmarks.

*Problem 3.*—In the case where winds aloft are not known, a pilot can accurately determine them by conducting a check flight and using the values thus obtained to calculate the unknown factors. This is accomplished by flying at the desired altitude over land marks of known distance and known true directions, such as roads lying on section lines, accurately clocking the time for the known distance and observing the compass to determine the magnetic heading when flying a known true course. Let it be assumed that it was desired to fly at 5000 feet altitude, that a check flight was conducted over terrain which had roads running due north and south and due east and west being spaced at one mile intervals and that the magnetic variation existing was 10° east. Let it be further assumed that the following factors were determined on the check flight:

True course_____degrees__ 90
Magnetic heading_____do_____ 66
Time for one mile_____seconds__ 50
Air temperature_____degrees F__ 40
Indicated airspeed_____miles per hour__ 81

In order to determine the wind velocity and direction the following factors must be calculated:

Ground speed in miles per hour
True airspeed in miles per hour
Magnetic course in degrees
Drift angle in degrees Ground speed and true airspeed are calculated from the known factors on the flight factor side of the flight calculator. To determine ground speed rotate disc 30 relative to disc 29 until the 50 line on the circular scale 34 (which corresponds to 50 seconds time for one mile) is adjacent the 10 line on the circular scale 33 (which corresponds to one mile). Read the ground speed 72 miles per hour adjacent the "Sec. index" 36. The true airspeed 87 miles per hour is determined in the manner described in Problem 1.

The magnetic course equals the difference between the true course and the magnetic variation or 90°−10°=80°. The drift angle equals the difference between the magnetic course and the magnetic heading or 80°−66°=14° right drift.

With the above factors known the wind velocity and direction can be computed on the navigation side of the flight calculator. This is accomplished in the following manner. Rotate the wind dial 11 until 90° line is adjacent the true course index 10. Move the slide assembly 13 until the index 27 is adjacent the line 72 on the ground speed scale 28 (which corresponds to the 72 miles per hour ground speed determined on the flight factor side). Rotate the arm 14 until the drift angle index 26 is adjacent the 14° line on the right drift side of the arcuate scale 25. Read the wind velocity 25 miles per hour and the wind direction 30° under the point corresponding to 87 on the linear scale 24 (which corresponds to 87 miles per hour true airspeed determined on the flight factor side of the calculator). Thus wind velocity and wind direction have been easily determined and the pilot would then have sufficient information to solve problems similar to Problems 1 and 2.

*Problem 4.*—The mileage per gallon of fuel can be readily determined if desired by using the flight factor side of the flight calculator. Let it be assumed that a ground speed of 72 miles per hour had been determined by the method given in Problem 3 and that a fuel consumption of 3.6 gallons per hour was known. To determine the miles per gallon, rotate the disc 30 relative to the disc 29 until the 72 line on the circular scale 33 (which corresponds to the speed 72 miles per hour) is adjacent the 36 line on the circular scale 34 (which corresponds to the fuel consumption of 3.6 gallons per hour). Read the mileage 20 miles per gallon on the circular scale 33 adjacent the "unit index" 35.

It is readily apparent from the above problem that the flight calculator described will be of considerable aid to all persons who must be familiar with air navigation problems and particularly to the pilot who must be his own navigator while he is flying an aircraft.

I claim:

1. A flight calculating device which comprises an elongated rectangular base member, a graduated disc member and a slidable assembly, said base member having a linear scale corresponding to ground speed, an arcuate scale corresponding to drift and variation and an index for indicating the true course, said arcuate drift and variation scale and said true course index being adjacent one end of said base member, said disc member being pivotally mounted on said base member and having a graduated scale on the periphery corresponding to a compass rose, radial lines corresponding to wind direction and concentric circular lines corresponding to wind velocity, said graduated scale being in registration with said arcuate scale, said slidable assembly mounted on said base member for sliding thereon comprising a slide member and an arm pivoted thereto, said slide member having a portion extending across the face of the base member and having flanged edge engaging portions to engage the edges of said base member to slide thereon and having an index for indicating ground speed, one end of said arms overlapping said disc member and having a linear scale corresponding to true airspeed, the other end of the said arm and said slide member having cooperating elements, one of said elements being an arcuate scale corresponding to drift angle, the other element being an index for indicating drift angle, said members, scales and indices cooperating whereby the unknown factors of air navigation may be determined by the proper setting of the known factors.

2. The device set forth in claim 1, having said ground speed scale parallel to the center line of said base member and cooperating with said ground speed index, said linear true air speed scale originating at the center of said arm pivot, said arcuate drift scale having center of arc in common with center of said arm pivot, said arcuate wind drift scale and said drift angle index being positioned symmetrically of a straight line connecting the center of said arm pivot and center of disc pivot in their zero relation.

3. In a flight calculator of the character described, the combination consisting of an elongated base member having a set of ground speed graduations extending longitudinally thereof, a centrally pivoted disc mounted on said base member adjacent one of its ends and having radial graduations corresponding to wind direction extending through 360 degrees with subdividing concentric circles corresponding to wind velocity, said base member having also an indicator thereon in cooperative relation to the outermost edge portion of said pivoted disc, a slide member constrained to move longitudinally of said base member and having an indicator thereon disposed for cooperation with the ground speed graduations of said base member, and an extended arm pivotally connected intermediate its ends to said slide member at a point determined by the intersection of perpendicular lines extending respectively from the pivot point of said pivoted disc and at right angles to the set of ground speed graduations, one end of said extended arm having a transparent portion overlying said pivoted disc and provided with a set of true air speed graduations radially aligned with its point of pivotal connection, and the other end of said extended arm and the adjacent portion of said slide member being provided with relatively movable drift angle arc graduations and index means which are respectively concentric and radial with respect to the point of pivotal connection of said extended arm.

4. In a wind triangle calculator of the character described, the combination consisting of an elongated base member having a set of ground speed graduations extending longitudinally thereof, a centrally pivoted disc mounted on said base member adjacent one of its ends, with its periphery spaced from that end, and said disc having radial graduations corresponding to wind direction extending through 360 degrees with subdividing concentric circles corresponding to wind velocity, and said base member having also an indicator thereon in cooperative relation to the outermost edge portion of said pivoted disc and flanked on each side by graduated scales forming continuations of the opposed radial graduations of said disc and corresponding to both wind drift and magnetic compass variation, a slide member constrained to move longitudinally of said base member and having an indicator thereon disposed for cooperation with the ground speed graduations of said base member, and an extended arm pivotally connected intermediate its ends to said slide member at a point determined by the intersection of perpendicular lines extending respectively from the pivot point of said pivoted disc and at right angles to the set of ground speed graduations, one end of said extended arm having a transparent portion overlying said pivoted disc and provided with a set of true air speed graduations originating with its point of pivotal connection, and the other end of said extended arm and the adjacent portion of said slide member being provided with relatively movable drift angle arc graduations and index means which are respectively concentric and radial with respect to the point of pivotal connection of said extended arm.

5. In a wind triangle calculator of the character described, the combination consisting of an elongated base member having a set of ground speed graduations extending longitudinally thereof, a centrally pivoted disc mounted on said base member adjacent one of its ends, with its periphery spaced from that end, and having radial graduations corresponding to wind direction extending through 360 degrees with subdividing concentric circles corresponding to wind velocity, and said base member having also an indicator thereon in cooperative relation to the outermost edge portion of said pivoted disc, a slide member constrained to move longitudinally of said base member and having an indicator thereon disposed for cooperation with the ground speed graduations of said base member, and an extended rectilinear arm pivotally connected intermediate its ends to said slide member at a point determined by the intersection of perpendicular lines extending respectively from the pivot point of said pivoted disc and at right angles to the set of ground speed graduations, one end of said extended arm having a transparent portion overlying said pivoted disc and provided with a set of true air speed graduations originating with its point of pivotal connection, and the other end of said extended arm and the adjacent portion of said slide member being provided with relatively movable drift angle arc graduations and index means which are respectively concentric and radial with respect to the point of pivotal connection of said extended arm.

6. In a wind triangle calculator of the character described, the combination consisting of an elongated base member having a set of ground speed graduations extending longitudinally thereof, a centrally pivoted disc mounted on said base member adjacent one of its ends, with its periphery spaced from that end, and said disc having radial graduations corresponding to wind direction extending through 360 degrees with subdividing concentric circles corresponding to wind velocity, said base member having also an indicator thereon in cooperative relation to the outermost edge portion of said pivoted disc and flanked on each side by graduated scales forming continuations of the opposed radial graduations of said disc and corresponding to both wind drift and magnetic compass variation, a slide member constrained to move longitudinally of said base member and having an indicator thereon disposed for cooperation with the ground speed graduations of said base member, and an extended arm pivotally connected intermediate its ends to said slide member at a point determined by the intersection of perpendicular lines extending respectively from the pivot point of said pivoted disc and at right angles to the set of ground speed graduations, one end of said extended arm having a transparent portion overlying said pivoted disc and provided with a set of true air speed graduations originating with its point of pivotal connection, and the other end of said extended arm and the adjacent portion of said slide member being provided with relatively movable drift angle arc graduations and index means which are respectively concentric and radial with respect to the point of pivotal connection of said extended arm.

EVERT CARL HOKANSON.